United States Patent
Barrell et al.

(10) Patent No.: US 10,706,082 B1
(45) Date of Patent: Jul. 7, 2020

(54) DEDUPLICATION DATABASE MANAGEMENT

(71) Applicant: Seagate Technology LLC, Cupertino, CA (US)

(72) Inventors: Michael Barrell, Longmont, CO (US); Ian Davies, Longmont, CO (US); Kenneth F Day, III, Cedar Park, CO (US); Douglas Dewey, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 399 days.

(21) Appl. No.: 15/638,310

(22) Filed: Jun. 29, 2017

(51) Int. Cl.
*G06F 16/31* (2019.01)
*G06F 16/174* (2019.01)

(52) U.S. Cl.
CPC ........ *G06F 16/325* (2019.01); *G06F 16/1748* (2019.01); *G06F 16/322* (2019.01)

(58) Field of Classification Search
CPC .. G06F 11/1453; G06F 16/1748; G06F 3/067; G06F 11/1451; G06F 3/0644; G06F 3/0641; G06F 3/065; G06F 16/2365; G06F 16/24556; G06F 11/1464; G06F 16/27; G06F 16/174; G06F 16/1752; G06F 2201/80; G06F 11/1461; G06F 3/061; G06F 16/215
See application file for complete search history.

(56) References Cited

U.S. PATENT DOCUMENTS

| 5,943,677 | A | 8/1999 | Hicks | |
| 7,996,371 | B1 | 8/2011 | Deshmukh | |
| 8,086,799 | B2 | 12/2011 | Mondal et al. | |
| 8,131,687 | B2 | 3/2012 | Bates et al. | |
| 8,397,051 | B2* | 3/2013 | Beaman | G06F 16/2255 711/216 |
| 8,407,190 | B2 | 3/2013 | Prahlad et al. | |
| 8,453,257 | B2 | 5/2013 | Anglin et al. | |
| 8,458,144 | B2 | 6/2013 | Maydew et al. | |
| 8,694,703 | B2* | 4/2014 | Hans | G06F 3/0613 707/797 |
| 8,732,133 | B2 | 5/2014 | Attarde | |

(Continued)

OTHER PUBLICATIONS

Srinivasan et al.,"iDedup: Latency-aware, inline data deduplication for primary storage", NetApp, Inc., 2012, 14 pages.

*Primary Examiner* — Angelica Ruiz
(74) *Attorney, Agent, or Firm* — Setter Roche LLP; Kirk A. Cesari

(57) ABSTRACT

An apparatus may include a controller configured search a hash database storing entries corresponding to hash values of previously stored data to find a hash page of the hash database corresponding to a range of hash values including the first hash value. When the hash page is found, the controller may be configured to determine whether the hash page does not include an entry for the first hash value, the first hash page further including a base hash value for the range of hash values. When the hash page does not include an entry for the first hash value, the controller may be configured to generate a first entry of the first hash page for the first hash value, the first entry including an offset value from the base hash value corresponding to the first hash value and a data location at which the received data is to be stored.

14 Claims, 7 Drawing Sheets

(56) References Cited

U.S. PATENT DOCUMENTS

| | | |
|---|---|---|
| 8,812,874 B1 | 8/2014 | Clifford |
| 8,930,306 B1 | 1/2015 | Ngo et al. |
| 8,954,398 B1 | 2/2015 | Zhang et al. |
| 9,047,302 B1 | 6/2015 | Bandopadhyay |
| 9,092,151 B1 | 7/2015 | Floyd et al. |
| 9,449,011 B1 | 9/2016 | Chen et al. |
| 9,489,135 B2 | 11/2016 | Dukes et al. |
| 9,514,145 B2 | 12/2016 | Chhaunker et al. |
| 9,547,664 B2 | 1/2017 | Zinar |
| 9,575,673 B2 | 2/2017 | Mitkar et al. |
| 9,633,022 B2 | 4/2017 | Vijayan |
| 9,639,274 B2 | 5/2017 | Maranna et al. |
| 9,672,243 B2 | 6/2017 | McCreight et al. |
| 2010/0217953 A1* | 8/2010 | Beaman ............ G06F 16/2255 711/216 |
| 2010/0306412 A1 | 12/2010 | Therrien et al. |
| 2011/0099351 A1 | 4/2011 | Condict |
| 2011/0307447 A1* | 12/2011 | Sabaa ............... H04L 67/2842 707/637 |
| 2012/0124012 A1* | 5/2012 | Provenzano ........ G06F 16/1748 707/692 |
| 2012/0124046 A1 | 5/2012 | Provenzano |
| 2013/0036289 A1 | 2/2013 | Welnicki et al. |
| 2013/0318051 A1* | 11/2013 | Kumar ............... G06F 16/1748 707/692 |
| 2013/0339302 A1* | 12/2013 | Zhang ............... G06F 11/1461 707/649 |
| 2013/0339319 A1* | 12/2013 | Woodward ......... G06F 11/1461 707/692 |
| 2014/0115258 A1 | 4/2014 | Week et al. |
| 2014/0219041 A1 | 8/2014 | Kim et al. |
| 2014/0344216 A1* | 11/2014 | Abercrombie ...... G06F 12/0253 707/609 |
| 2015/0161194 A1* | 6/2015 | Provenzano ........... G06F 16/24 707/690 |
| 2015/0261776 A1 | 9/2015 | Attarde et al. |
| 2015/0261792 A1 | 9/2015 | Attarde et al. |
| 2016/0077926 A1* | 3/2016 | Mutalik .............. G06F 16/1844 711/162 |
| 2016/0078068 A1 | 3/2016 | Agrawal et al. |
| 2016/0162207 A1* | 6/2016 | Sharma ............... G06F 16/2255 711/162 |
| 2016/0306818 A1 | 10/2016 | Vijayan et al. |
| 2016/0306820 A1 | 10/2016 | Agrawal et al. |
| 2017/0083408 A1 | 3/2017 | Vijayan |
| 2017/0124108 A1 | 5/2017 | Mitkar et al. |
| 2017/0132088 A1 | 5/2017 | Maranna et al. |
| 2017/0206022 A1 | 7/2017 | Theinert |

\* cited by examiner

DEDUPLICATION DATABASE MANAGEMENT

SUMMARY

In some embodiments, an apparatus may include a controller configured to receive data and a request to store the data to a data storage medium, compute a first hash value from the received data, and search a hash database storing entries corresponding to hash values of previously stored data to find a first hash page of the hash database corresponding to a range of hash values including the first hash value, the hash database being a tree structure including a root node and at least one leaf node. When the first hash page is found, the controller may be configured to determine whether the first hash page does not include an entry for the first hash value, the first hash page including a plurality of entries in the range of hash values corresponding to the first hash page, the first hash page further including a base hash value for the range of hash values. When the first hash page does not include an entry for the first hash value, the controller may be configured to generate a first entry of the first hash page for the first hash value, the first entry including an offset value from the base hash value corresponding to the first hash value and a data location at which the received data is to be stored.

In some embodiments, a method comprising receiving data and a request to store the data to a data storage medium, computing a first hash value from the received data and searching a hash database storing entries corresponding to hash values of previously stored data to find a first hash page of the hash database corresponding to a range of hash values including the first hash value, the hash database being a tree structure including a root node and at least one leaf node. When the first hash page is found, the method may further include determining whether the first hash page does not include an entry for the first hash value, the first hash page including a plurality of entries in the range of hash values corresponding to the first hash page, the first hash page further including a base hash value for the range of hash values. When the first hash page does not include an entry for the first hash value, the method may further include generating a first entry of the first hash page for the first hash value, the first entry including an offset value from the base hash value corresponding to the first hash value and a data location at which the received data is to be stored.

In some embodiments, a device comprising an interface configured to receive data and a request to store the data to a data storage medium, an input module configured to compute a first hash value from the received data. The device may further include a hash database module configured to search a hash database storing entries corresponding to hash values of previously stored data to find a first hash page of the hash database corresponding to a range of hash values including the first hash value, the hash database being a tree structure including a root node and at least one leaf node, when the first hash page is found, determine whether the first hash page does not include an entry for the first hash value, the first hash page including a plurality of entries in the range of hash values corresponding to the first hash page, the first hash page further including a base hash value for the range of hash values, and when the first hash page does not include an entry for the first hash value, generate a first entry of the first hash page for the first hash value, the first entry including an offset value from the base hash value corresponding to the first hash value and a data location at which the received data is to be stored.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

Figure 1:
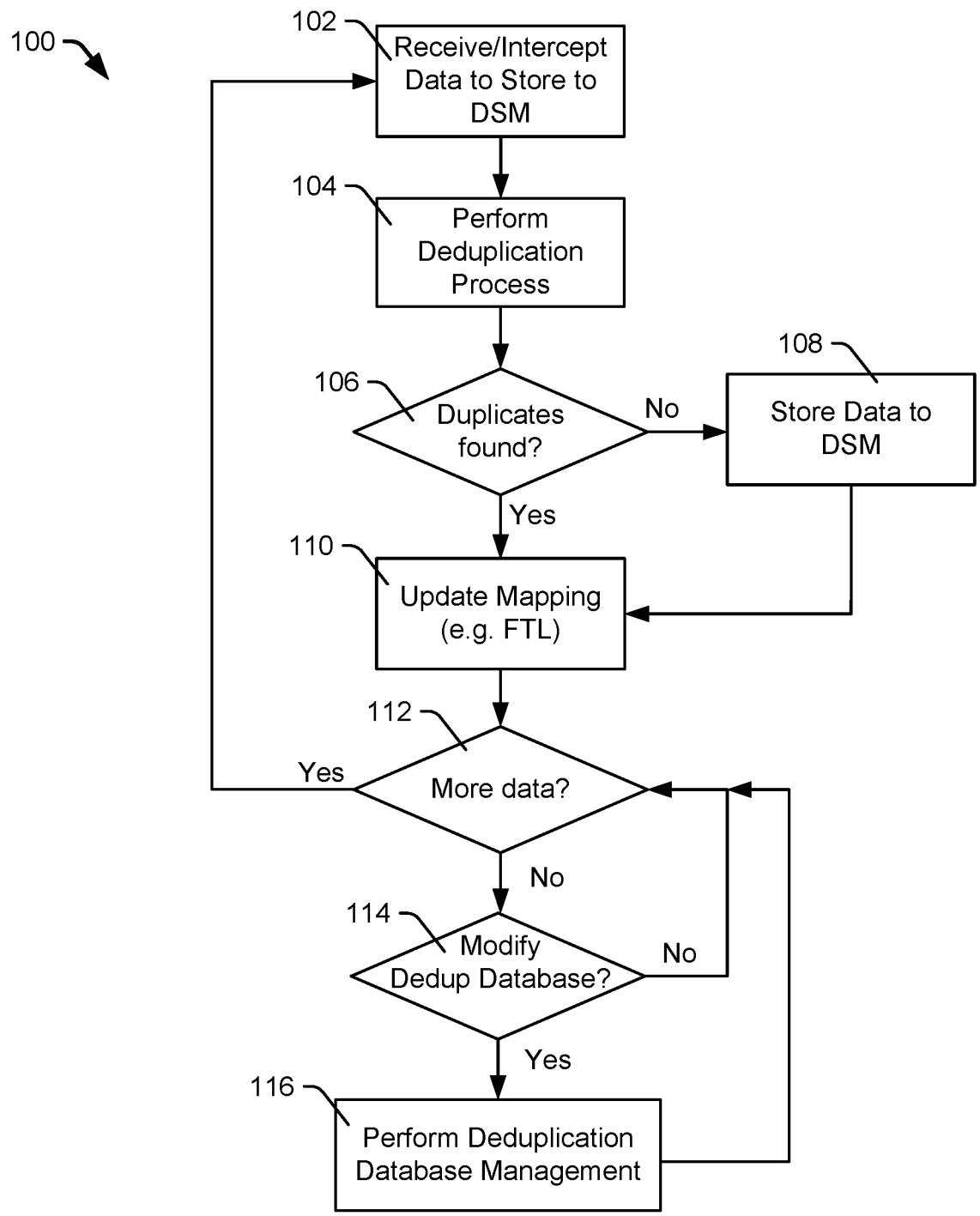
FIG. 1 is a flowchart of a method of database deduplication management, in accordance with certain embodiments of the present disclosure.

Referring to FIG. 1, a flowchart of a method of database deduplication management is shown and generally designated 100, in accordance with certain embodiments of the present disclosure. Specifically, FIG. 1 provides examples of a database deduplication management method that may be performed by a data processing device, such as a host computer, data storage device, server, processor, or controller. The method 100 can be used to reduce the amount of data stored, the amount of writes to a data storage system, or to reduce a size of a deduplication database, or a combination thereof.

The method 100 can include receiving data to store to a data storage medium, at 102. The data may be received at a data storage device, server, computer, or other device that is configured to execute the functions of the method 100. The data storage medium may be an individual data storage device, an array of data storage devices, or one or more data storage servers, such as a distributed data storage system. A data deduplication process may be performed on the data, at 104. The data deduplication process may compare newly received data to existing data to determine if there are matches or redundancy between data. The comparison may be made on any granularity of amount of data, however the method may be configured based on efficiency and resources available.

The data deduplication process may be based on a hash of the received data compared to an existing hash database. The method 100 may compare a newly calculated hash, such as for newly received data, to the hash database to look for a match within the database. When duplicate data is not found, such as no existing duplicate hash in the hash database, at 106, the data may be stored to a data storage medium, at 108. When a duplication match is found at 106, a mapping table, such as a flash translation layer or physical to logical address mapping table, may be updated to logically associate a logical address (or logical storage address) of the received data with the pre-existing duplicate data already stored in a data storage medium, at 110. This can be done without storing the data associated with the duplicate hash to the data storage medium; thus, potentially saving space within the data storage medium or reducing a number of storage operations to the data storage medium.

The system may perform the deduplication process for more data, at 112. The process may be performed for all data intended to be stored to the data storage medium, or may be performed for a subset of the data intended to be stored to the data storage medium. In addition to the deduplication process described herein, the method 100 may also include a deduplication database management process, at 114 and 116.

The deduplication database management process may include a trigger, at 114, to determine whether to perform deduplication database management, at 116. Examples of the trigger may include a timer, an indicator of resources available, a user initiated trigger, or another trigger or flag. For example, the deduplication database management process may be run as a background process when the system has unused resources available to run the process, which may be run periodically when such resources area available. In some instances, the deduplication database management process may be initiated once a data storage system has been in an idle mode for a certain period of time, after a specific number of storage operations has occurred, when a certain amount of resources are available, or a combination thereof. In some embodiments, the descriptions of the deduplication process described herein can be performed inline as part of a current write process; for example, the system could execute some or all of the deduplication functions during performance of a write/store data process rather than as a background process. Also, the systems and methods described herein may execute the deduplication process(es) inline as part of a store data process and also during a background process; for example, the functions thereof can be selectively assigned when to execute during the inline process versus background process based on an analysis of the benefits to the goals of a specific system.

The deduplication database management process may include a deduplication database trimming process, which may include one or more operations to reduce the size (e.g. the amount of data space the database occupies or a number of items stored within the database) of the deduplication database. In some examples, the trimming process can trim unique data from the deduplication database to make the size of the database(s) smaller. The trimming process may also trim data that is duplicate data depending on its ability to find duplicates. For example, if data set A is written, then the database will be filled with information (e.g. hash entries) relating to data set A. Then if data set A is written again, all entries in the database will become a duplicate. Then if data sets B, C, or D, etc. are written, nothing will be a duplicate entry since information for data set A is in the database and nothing else is. In this scenario, the database can be trimmed of the information related to data set A if the system has not seen any duplicates of data set A in some period of time.

In a deduplication database (e.g. a database that stores hash values generated from specific data) for a large data storage system, the total number of hash entries can be very large and impractical to search through. The database can be designed to store up to a maximum number of entries and after that the performance of the database drops significantly. The reason for the drop in performance is that once the data set grows outside of the bounds of the system memory the persistent media may need to be consulted for every data access which greatly slows things down. Alternatively, a hash database may be stored entirely within the system memory, which may require an increasingly large portion of the memory and reduce the amount of memory available for other tasks, thereby degrading system performance.

To solve these problems, as well as others, the database design can include an indicator for every entry that indicates an age associated with the respective entry. Then, for example, a process can search through the database looking for entries that have not had a duplicate within a certain amount of time. There may be a strong temporal component to data duplication, with duplicate data most likely to occur within a limited time interval. Those entries that have not had a duplicate within a certain amount of time may be unlikely to become duplicates and may be selected to be removed from the database. This process and database design can be configured to keep the size of the database smaller, maintain a certain performance profile, or stay within the bounds of the hardware, or any combination thereof.

Further, database designs may improve database performance by reducing redundant storage of hash value data or by selectively maintaining some portions of the hash database in system memory and other portions in persistent storage.

Figure 2:
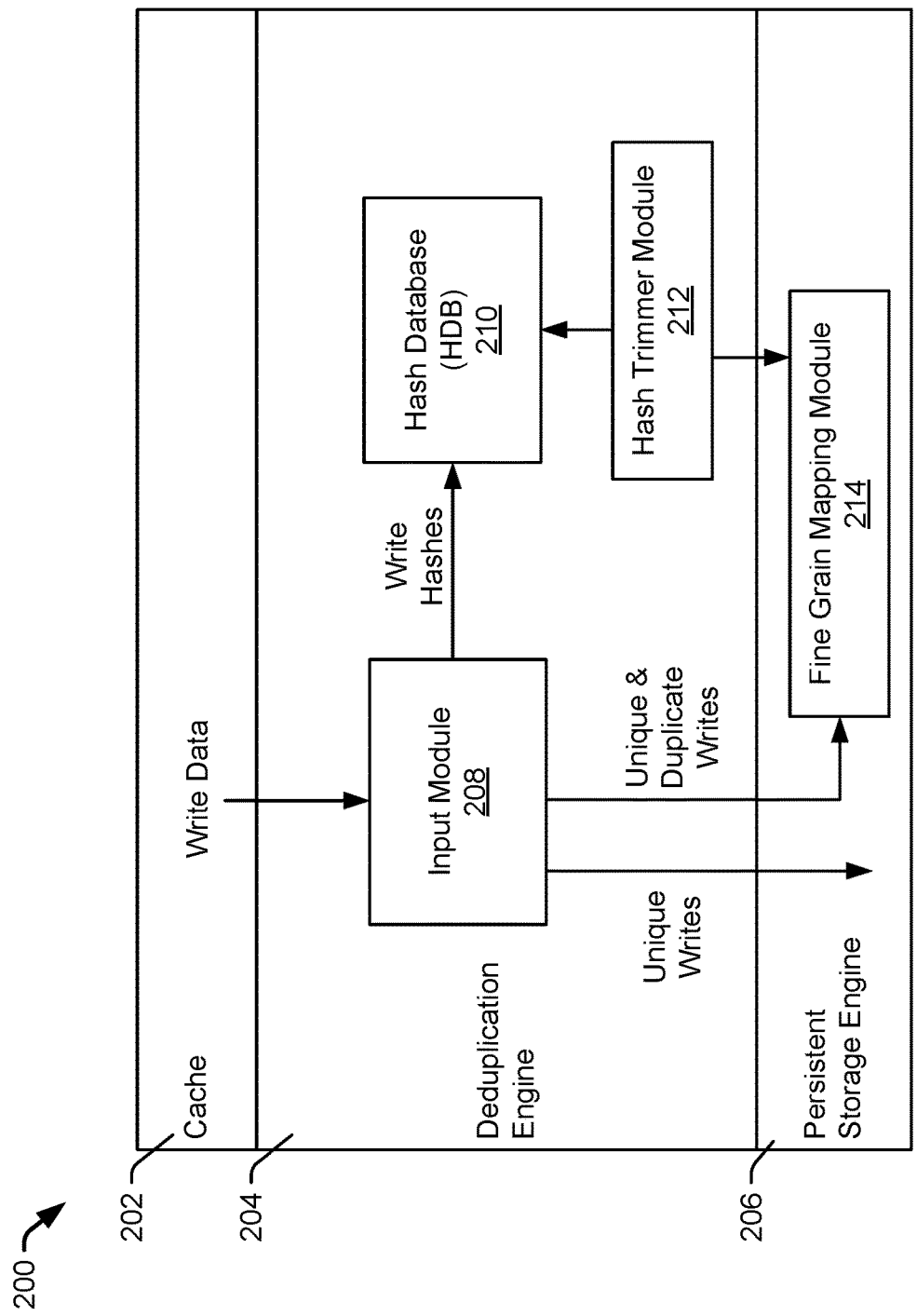
FIG. 2 is a functional block diagram of a database deduplication management system, in accordance with certain embodiments of the present disclosure.

Referring to FIG. 2, a functional block diagram of a database deduplication management system is shown and generally designated 200, in accordance with certain embodiments of the present disclosure. The system 200 can perform the functions, processes, and methods described herein. The system 200 can include a cache 202, a deduplication engine 204, and a persistent storage engine 206. The deduplication engine 204 and persistent storage engine 206 may be any combination of processor(s), controller(s), logic circuit(s), or firmware that can perform the functions described herein. The deduplication engine 204 can include an input module 208, a hash database (HDB) 210, some-times called a deduplication database, and a hash trimmer module 212. The persistent storage engine 206 may include a fine grain mapping module 214.

The cache 202 may store write data received at the system 200 to be stored to persistent storage, such as a nonvolatile data storage medium. The input module 208 may calculate a hash for all write data received to be stored to the persistent data. The input module 208 may also check the HDB 210 for matches and perform a data comparison to confirm a match between a write hash and an existing hash in the HDB 210. For example, the input module 208 may send each write hash to the hash database 210. The hash database 210 may perform a search for the write hash and inform the input module 208 of whether the write hash already exists in the hash database 210 for the write data (e.g. an entry corresponding to the write hash already exists in the database). The hash database 210 may further return the physical logical block address (pLBA) of the data corresponding to the existing hash that matches the write hash (e.g. when a write hash is found to be for a duplicate write). The input module 208 may send write data for both unique and duplicate writes, identified based on locating a duplicate hash value in the HDB 210, to the fine grain mapping module 214.

In some examples, the fine grain mapping module 214 may utilize a fine grain mapping function to map logical block addresses to physical block addresses, such as user logical block addresses (uLBAs) to physical logical block addresses (pLBAs); such can allow for multiple uLBAs to map to the same pLBA. For example, the fine grain mapping module 214 may map the uLBA of the write data to a pLBA. In the case of unique or non-duplicative write data, the pLBA may be determined by various means, such as by determining a next available pLBA to be written. In the case of duplicative write data, the pLBA may be determined based on the pLBA returned to the input module 208 by the hash database 210. In this manner multiple duplicative data writes, each having unique uLBAs, can be mapped to a single pLBA.

The input module 208 may also send unique writes (e.g. writes corresponding to write data for which no match was found in the HDB 210) to the persistent storage engine 206 for storage to a persistent storage medium along with the pLBAs at which the unique data is to be stored (e.g. as determined by the fine grain mapping module 214).

In some embodiments, such as embodiments in which the hashes are not guaranteed to be unique to all possible write data, the input module 208 may perform a check to determine if the write data is unique by direct comparison with the data stored in the persistent storage rather than relying solely on the hash comparison. In some examples, when a hash match occurs for different write data, various error handling routines may be utilized.

The hash trimmer module 212 may include a deduplication database trimming process, which may execute one or more operations to reduce a size of the hash database 210. The trimming process can trim unique data from the deduplication database 210 to make the size of the database smaller. In some examples, the trimming process may periodically remove entries from the HDB 210 when the entries selected for removal have not had a hash or duplicate data match from received write data within a certain period of time. The period of time may be based on a number of operations executed, a timer, or a system clock.

Figure 3:
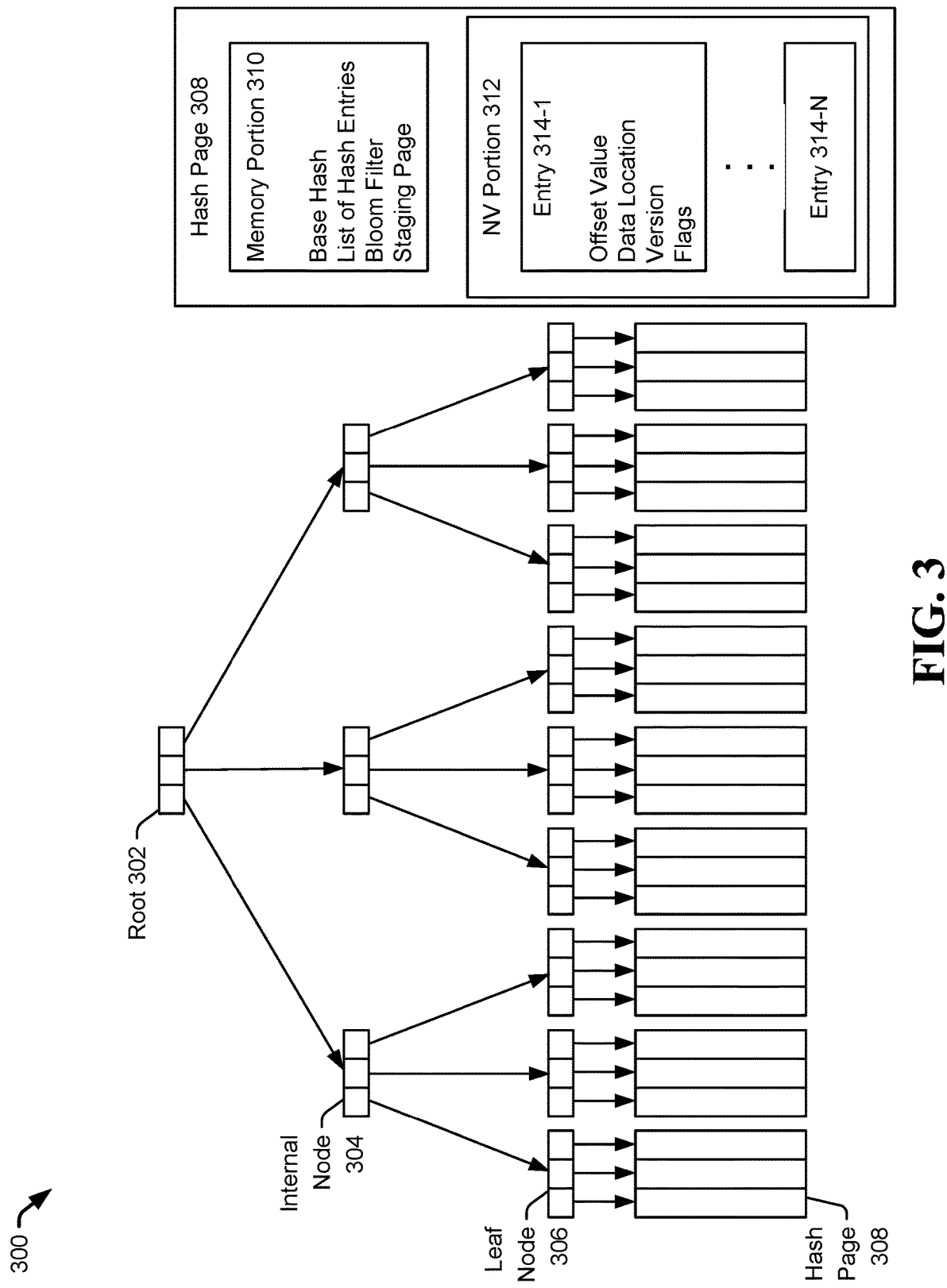
FIG. 3 is a block diagram of a hash database, in accordance with certain embodiments of the present disclosure.

Referring to FIG. 3, a block diagram of an example hash database is shown and generally designated 300, in accordance with certain embodiments of the present disclosure.

As shown in FIG. 3, the hash database may be a form of tree structure, such as a B+ tree. A B+ tree may be an n-array tree with a variable number of children per node. A B+ tree may consist of a root 302, internal nodes 304, leaf nodes 306 and hash pages 308 (e.g. records). The root 302 may be either a leaf or a node with two or more children. Internal nodes 304 may have other internal nodes 304 or leaf nodes 306 as children. Leaf nodes 306 may have hash pages 308 as children.

Generally, hash pages 308 may be considered structures which store entries for a corresponding range of hash values. For example, each hash page in a hash database may correspond to a range of 1000 hash values (entries). As such, a particular hash page may be instantiated and utilized to store one or more hash entries in a range from 5000 to 5999. As such, when a hash value of 5241 is generated for a particular write data, the hash database may determine if the hash page corresponding to the range of hash values from 5000 to 5999 exists in the database and, if so, whether an entry for the hash value 5241 already exists in the hash page. Additional operations regarding hash pages are discussed below.

As shown in FIG. 3, each hash page 308 may include a memory portion 310 and a non-volatile (NV) portion 312. As mentioned above, some embodiments may improve database performance by selectively maintaining some portions of the hash database in system memory and other portions in persistent storage. In the embodiment illustrated in FIG. 3, the root 302, internal nodes 304, leaf nodes 306 and the memory portions 310 of the hash pages 308 may be continuously maintained in system memory while the NV portions 312 of the hash pages 308 may be maintained in non-volatile storage and loaded into system memory when in use (e.g. when a duplicate hash is found or when the entries 314-1 to 314-N stored in the NV portion 312 are to be updated).

Further, the memory portion 310 of the hash page 308 may include a base hash and the entries such as 314-1 to 314-N may include an offset value. As mentioned above, some embodiments may improve database performance by reducing redundant storage of hash values. Returning to the above example in which each hash page may correspond to a range of 1000 hash values and taking as a particular example the hash page corresponding to hash values in the range of 5000 to 5999, the base hash value of that particular hash page maybe 5000 and the offset value stored with each entry 314 may be the difference of the entries hash value from the base value (e.g. 241 in the case of hash value 5241). In this way, in systems with large numbers of hash pages relative to the number of entries per hash page, a significant portion of the hash value may not be redundantly stored which may reduce database size and improve overall performance. The list of hash entries and bloom filter included in the memory portion 310 of the hash pages 308 may be used to search for particular hash values without loading information from the nonvolatile portion 312 and will be discussed in more detail with regard to FIGS. 4-7. The staging page of the memory portion 310 may be utilized as a form of buffer space in which updates to the entries of the hash page 308 stored in the nonvolatile portion 312 may be staged for a subsequent update to the NV portion 312. For example, staging pages may be set to store 20 updates (or some other threshold number of staged entries) in system memory before the updates are flushed or merged with the NV portion 312. In some embodiments, reducing the number of writes to the NV portion 312 may improve the performance of the system.

The data location field of an entry of the hash page may be the physical logical block addresses (pLBAs) of the data corresponding to the entry. The version field of an entry may be a value or values that may indicate one or more of whether the corresponding data is unique or shared data (e.g. duplicated), a number or rough number of times the shared data has been duplicated, and a number of times the trimmer has seen the entry. The flags field of an entry may indicate other information such as whether the entry is a sampled entry which should be aged out more slowly than other entries. More details regarding the version and flags fields is provided below.

Figure 4:
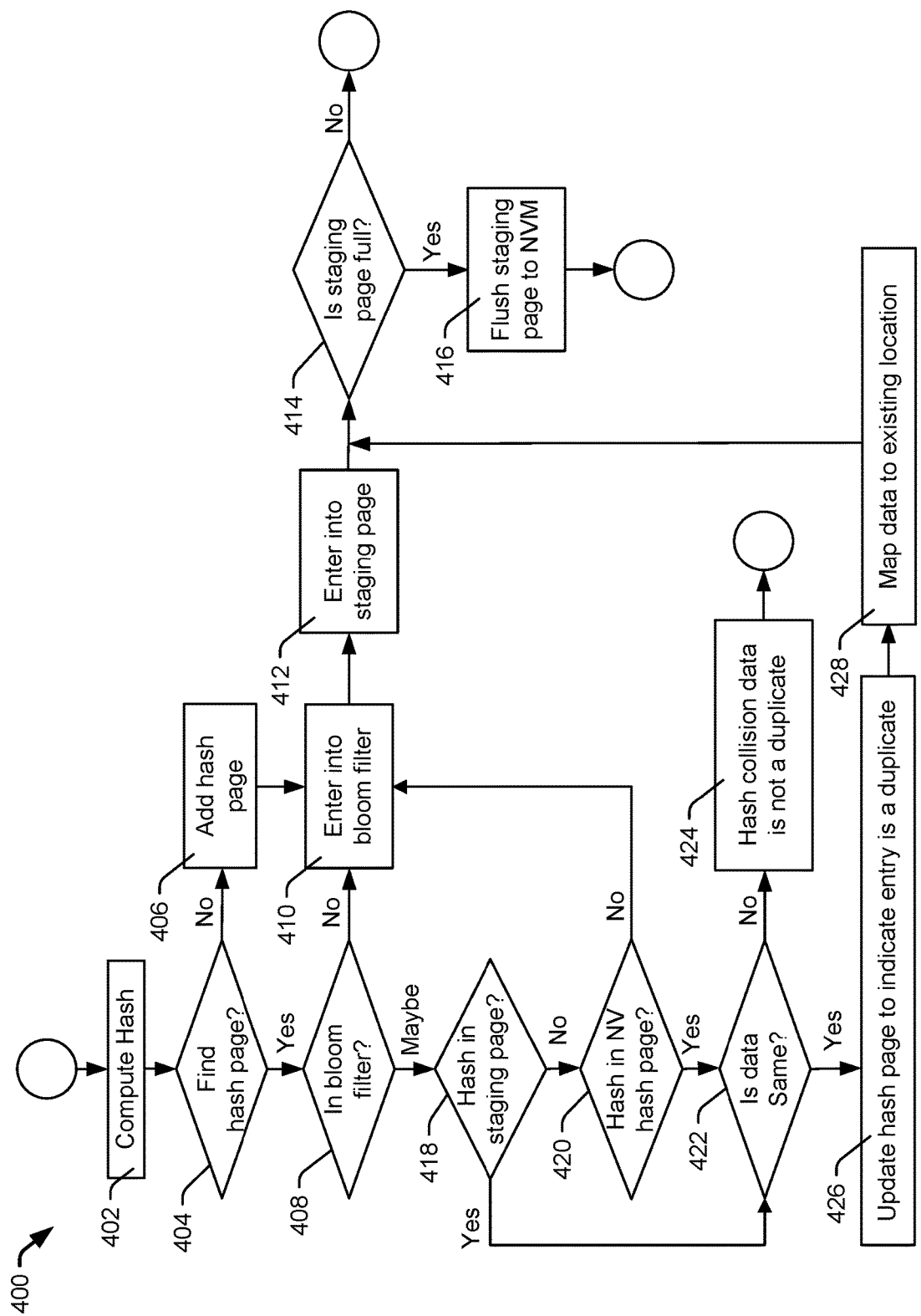
FIG. 4 is a flowchart of a method of database deduplication management, in accordance with certain embodiments of the present disclosure.

Referring to FIG. 4, a flowchart of a method of database deduplication management is shown and generally designated 400, in accordance with certain embodiments of the present disclosure. Method 400 provides examples of a data deduplication process that can be used with the systems and methods described herein. For example, the method 400 can be performed for write data received in a cache of a data storage system, such as shown in FIG. 2.

The method 400 may compute a hash value for data, such as received write data, at 402. The hash value may be computed using any known hash function. The method 400 may then determine if a hash page corresponding to a range of hash values including the computed hash value exists in the hash database, at 404. If not, at 406, the method 400 may add a hash page corresponding to the range of hashes which may include the hash value to the hash database and may continue to 410. If a hash page corresponding to the range including the hash value is found (e.g. is already present in the hash database), the process may continue to 408. The method 400 may then determine if the hash value exists in hash page of the hash database, at 408. In some examples, this can be accomplished using a Bloom Filter, which is a data structure that can be used to check for membership of an element in a set of elements, which may provide false positives but not false negatives. For example, comparing a hash value to a Bloom filter may return results of "possibly in the HDB" or "definitely not in the HDB." When the hash value is not in the Bloom filter, at 408, the method 400 may enter the hash value as a new entry in the HDB at 410 and 412. More particularly, the hash may be entered into the Bloom Filter at 410. Once the new entry is entered into the Bloom Filter, the method 400 may generate an entry corresponding to the hash value and enter the entry into a staging page at 412. In addition, while generating the entry, a new pLBA may be obtained from the fine grain mapping module 214. The pLBA may be stored in the generated entry and a write command may be issued to the persistent storage engine to store the write data at the pLBA in the persistent storage medium.

As mentioned above, the staging page may be utilized as a buffer or staging area in system memory for updates to the entries of the hash page that have not yet been flushed or merged to the entries stored in non-volatile memory (NVM). In some examples, caching updated entries or information for updating the entries in NVM in the staging page may reduce the number of input/output (I/O) operations required to maintain the portion of the hash page of the HDB in the NVM. When the staging page has reached a certain amount of data (e.g. when the buffer area is full), at 414, the staging page may be written, or flushed, to the NVM, at 416. Writing or flushing the staging page to the NVM may include adding new entries to, or updating or replacing existing entries in, the portion of the hash page in NVM. If, at 414, the staging page is not at a capacity to write to NVM, the process ends and awaits more write data.

When a match in the hash database is detected, at 408, such as via a Bloom filter, the method 400 may determine if an entry for the selected hash value is present in the staging page of the hash page, at 418. When an entry for the hash value is not present in the staging page, the method 400 may determine if an entry for the hash value is in the nonvolatile (NV) portion of the hash page, at 420. The determination of whether the hash is present in the NV portion may be based on the list of hash entries in the memory portion of the hash page or based on a search of the entries after loading the entries from the NVM into system memory. When an entry for the hash value is not in a NV portion of the hash page, it may indicate a false positive from the Bloom filter at 408, and accordingly the hash value may be entered into the Bloom filter and a new entry for the hash value may be entered into the staging page, at 410 and 412.

When an entry for the hash value is in the staging page, at 418, or is in the NV portion of the hash page, at 420, the method 400 may determine if the write data corresponding to the hash value matches the data corresponding to the existing hash database entry. For example, the data stored at the pLBA of the existing entry for the hash value, may be retrieved from the persistent storage medium and compared to the write data. When the hash value of the write data matches a hash value in the HDB corresponding to previously stored data but the write data is not the same as the previously stored data, it may be considered a "hash collision". While rare, two different unique data chunks may produce an identical hash value in some hash calculation functions which do not guarantee unique hash values for all data, and therefore hash collisions mean the new data is not duplicate data. When a hash collision occurs, at 422, the data is indicated as not a duplicate, at 424, and the process ends. In some embodiments, the system may perform collision resolution procedures to handle the error. Alternatively or additionally, in some example embodiments, if two pieces of data have the same hash value but are not duplicate data, then the data received second may not initiate a deduplication of the first received data. Further, the hash value corresponding to the second received data may not be added to the hash database. When the data corresponding to the hash value is the same as data corresponding to a hash collision, at 422, an updated version of the corresponding hash page entry in the HDB may be entered into the staging page (e.g. an updated version that indicates the entry relates to duplicate data), at 426, and the method 400 may request the fine grain mapping module map the uLBA corresponding to the write data to the pLBA of the existing hash page entry, at 428. The process may then continue to 414 as discussed above.

Figure 5:
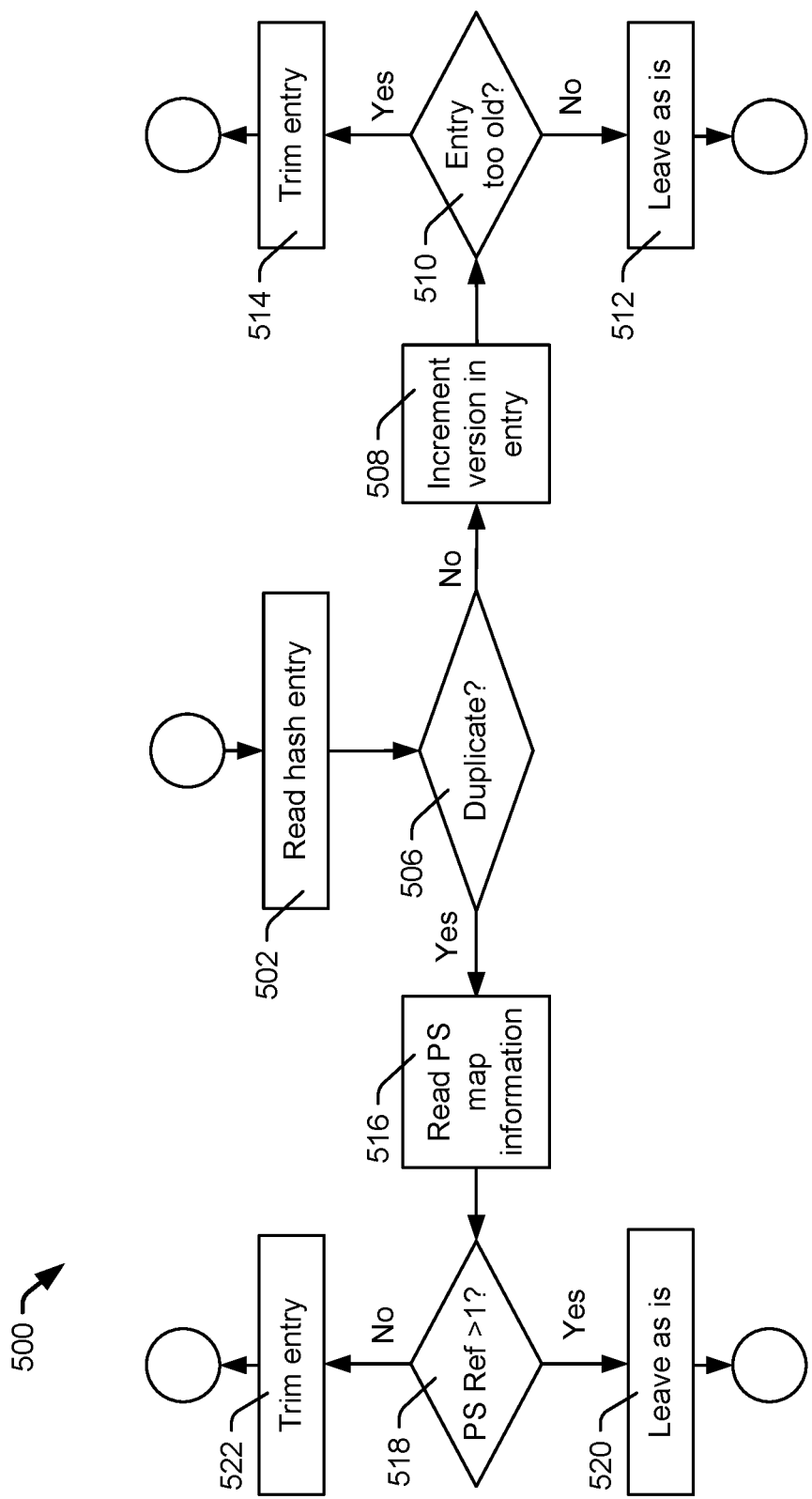
FIG. 5 is a flowchart of a method of database deduplication management, in accordance with certain embodiments of the present disclosure.

Referring to FIG. 5, a flowchart of a method of database deduplication management is shown and generally designated 500, in accordance with certain embodiments of the present disclosure. Method 500 provides examples of a hash database trimming process that can be used with the systems and methods described herein. For example, the method 500 can be performed by a trimming module for a hash database in a deduplication process, such as in FIG. 1, FIG. 2, FIG. 3 or FIG. 4.

The method 500 may be triggered based on a timer, a counter, a workload of a processing system, a user or host initiated command, or another type of trigger. In some examples, a write operation counter or countdown timer may be utilized to trigger the method 500 to start periodically. For example a trimming operation may be performed a set time intervals (e.g. four times a day in six hour intervals).

The method 500 may include reading a selected hash entry from a hash page of the hash database, at 502, and determining if the hash entry corresponds to duplicate data (e.g. more than one uLBA points to a pLBA storing data corresponding to the hash entry), at 506. In some examples, the hash entry may store an indicator of whether a duplicate hash was detected, which can be read by a trimming module. The indicator may also indicate a number of times a duplicate of the corresponding data has been detected. An example of such is provided in FIG. 6.

When the hash entry does not correspond to duplicated data, at 506, a counter may be incremented to count the number of times the hash trimming method 500 has examined or scanned the selected hash entry, at 508. The counter may be, as in the example in FIG. 6, be part of each hash entry in the hash database.

When the selected hash entry does not correspond to duplicate data, the method 500 may determine if the entry is old enough to remove from the database, at 510, which may be done based on a timer or a counter. In some examples, the counter associated with each hash entry may be compared against a threshold to determine a relative age of the entry. When the counter is above a threshold, the entry may be removed from the hash database, at 514. When the counter is not above a threshold, the entry may remain in the hash database, at 512. In some instances, the counter may be a time stamp that can be compared against a timer to determine a relative age of an entry.

When the method 500 detects the selected hash entry corresponds to duplicated data, at 506, mapping information (e.g. flash translation layer, LBA-to-PBA map, or other persistent storage (PS) mapping system) for the data corresponding to the hash entry may be retrieved from a memory. The mapping information may be evaluated to determine if there are multiple uLBAs mapped to the pLBA corresponding to the hash entry, at 518. For example, the mapping information could be consulted to determine if the number of user logical addresses referencing the same PS physical location is greater than one. In some examples, such as systems that use a page virtualization management method for virtual data storage, a system may check to see if the physical data exists in multiple pages (e.g. the number of page storage locations of a piece of physical data is greater than one), at 518. This can be a double check by the method 500 to determine if the data is still a duplicate, as situations could arise where data that once was a duplicate is no longer a duplicate and is now unique data that could have an associated entry trimmed from the hash database. When there are no actual duplicates, at 518, the associated entry may be removed from the hash database, at 522. When there are actual duplicates, at 518, the associated entry may remain in the hash database, at 520. Depending on implementation, the non-duplicated entry may be maintained in the database until it is older than the removal threshold (e.g., the method 500 may proceed from a "yes" determination at 518 to the age incrementing step at 508).

The method 500 may execute for every hash entry in the hash database, or may execute for a selected subsets of entries. The trimming method 500 may be executed periodically, such as after a predetermined amount of time has elapsed or after a specific number of write operations has occurred. The trimming method 500 could also be triggered to be executed manually by a request from a user or another device. Also, such could be triggered to execute based on available storage capacities or size thresholds of the HDB, a data storage space, or any combination thereof.

Figure 6:
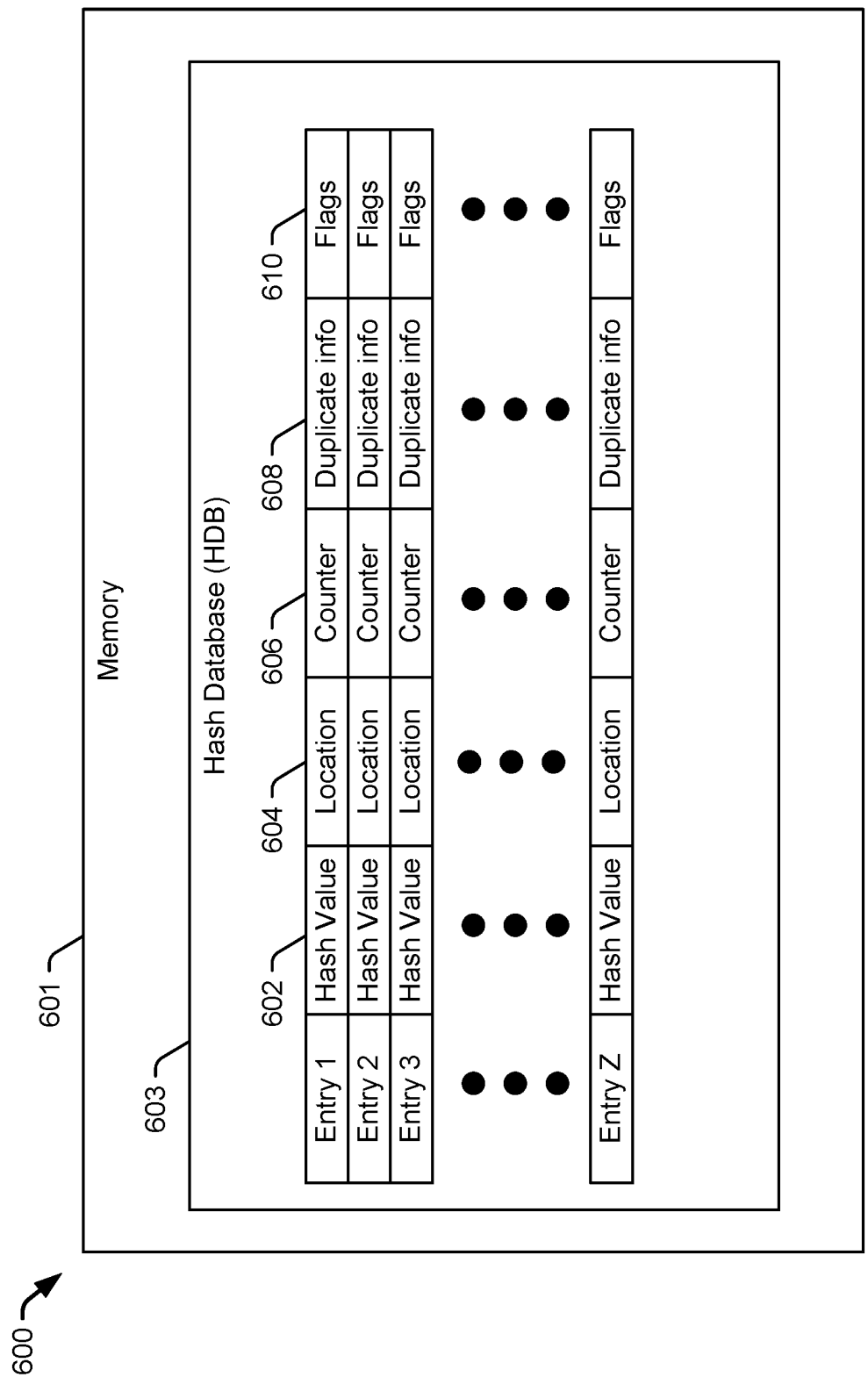
FIG. 6 is a block diagram of a database deduplication management system, in accordance with certain embodiments of the present disclosure.

Referring to FIG. 6, a block diagram of a database deduplication management system is shown and generally designated 600, in accordance with certain embodiments of the present disclosure. The system 600 can include a memory 601 that can store a hash database 603, which may be used with the systems and methods described herein. The memory 601 may include one or more physical memories, including any combination of volatile and nonvolatile memory, and different portions of the HDB 603 may be stored to different memories. In some examples, the hash database 603 may be implemented as shown and discussed above with respect to FIG. 3 and the discussion below may provide additional details that may be applied to the hash database of FIG. 3.

The hash database 603 may include an entry corresponding to each hash value 602 stored therein. The database 603 may also include location information 604, such as a physical logical block address, associated with the data the corresponding hash value was generated from.

The database 603 may also include a counter 606 for each hash entry that can be utilized by the systems described herein to store data indicating a relative time relationship. For example, the counter 606 may store a count of a number of times a database trimming process has been executed while the hash entry has been stored in the database 603. The counter 606 can also indicate whether data is unique or a match has been detected.

The database 603 may also include duplicate information 608 that can be utilized by the systems described herein to store data indicating whether an entry is a duplicate. The duplicate information 608 may also store a number of times, or an estimate of a number of times, a duplicate has occurred. Further, the database 603 may also store one or more flag indicators 610 to allow the system to perform other functions, such as an indicator to determine what data to keep in the database during the trimming process. In some embodiments, a single value of a database entry may serve multiple purposes. For example, the counter 606 may be an 8-bit value, with values from 0-127 indicating a number of times the entry has been scanned during a trimming operation, and values from 128-255 indicating duplicate info 608, such as whether the corresponding data has been duplicated and an amount of duplicates.

Figure 7:
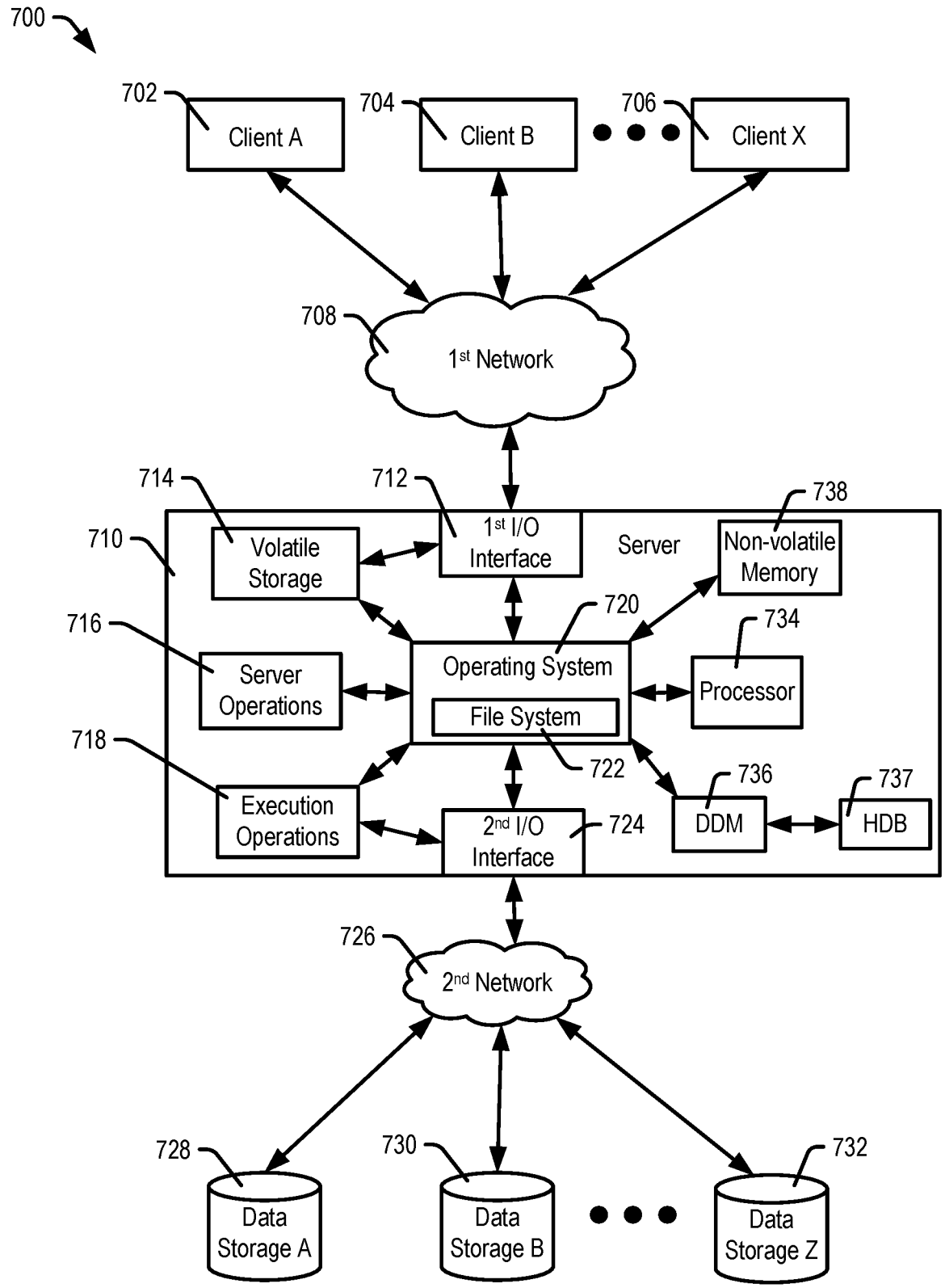
FIG. 7 is a block diagram of a database deduplication management system, in accordance with certain embodiments of the present disclosure.

Referring to FIG. 7, certain embodiments of a system for deduplication database management are shown and generally designated 700. System 700 can incorporate and execute the systems and methods described herein. The system 700 can include client A 702, client B 704, and client X 706, as well as any number of other clients, and may communicate with server 710 via a first network 708.

The server 710 can include a first input/output (I/O) interface 712, volatile storage 714, server node operation instruction module 716, client operations execution module 718, operating system 720, file system 722, processor 734, deduplication database management module (DDM) 736, hash database (HDB) 737, non-volatile memory 738, and second I/O interface 724. The HDB 737 may be stored to the volatile memory 714, the non-volatile memory 738, to other data storage mediums, or any combination thereof. The second I/O interface 724 may be coupled to arrays of data storage A 728, B 730, or Z 732 via a second network 726. While server 710 is referred to as a server, server 710 may be any type of computer processing device that allows for the functions of the DDM 736 and the HDB 737 to be performed, such as a host computer, data storage device, data storage controller, hardware logic, other devices, or any combination thereof.

In some examples, the file system 722 can be configured to perform data operations corresponding to data in the arrays of data storage A 728, B 730, or Z 732 based on requests from the clients A 702, B 704, or X 706. Various configurations of data storage may be used for the physical storage of data on the clients A 702, B 704, or X 706, as well as various levels of virtualization (e.g. groupings or associations of the data logically at the server 710 level). The DDM can interact with the file system 722 when data is received to store to any of the clients A 702, B 704, or X 706 to perform the deduplication management functions described herein, such as the duplication determination functions and the HDB trimming functions.

During operation, when a client sends an operation request, the first I/O interface 712 can receive the file operation request, the processor 734 can store the file operation request to a list of ordered operation requests, such as in the volatile storage 714. When resources are available, the file system 722 can direct the processor 734 to process the file operation requests via the execution operations module 718. The operations execution module 718 can perform data operations to retrieve, store, update, modify, create, delete (or any other operation) data in the arrays of data storage A 728, B 730, or Z 732, or any combination thereof. The server operations module 716 can manage faults, schedule tasks, manage power, monitor network traffic, or perform other operations.

While the above description includes some embodiments that describe data storage device implementations, the present disclosure can be applied to any system that needs to reduce data duplications. For example, the present disclosure can be utilized in a host computer or in a data storage device.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a controller configured to:
receive data and a request to store the data to a data storage medium;
compute a first hash value from the received data;
search a hash database storing entries corresponding to hash values of previously stored data to find a first hash page of the hash database corresponding to a range of hash values including the first hash value, the hash database being a tree structure including a root node and at least one leaf node;
when the first hash page is found, determine whether the first hash page does not include an entry for the first hash value, the first hash page including a plurality of entries in the range of hash values corresponding to the first hash page, the first hash page further including a base hash value for the range of hash values; and
when the first hash page does not include an entry for the first hash value, generate a first entry of the first hash page for the first hash value, the first entry including an offset value from the base hash value corresponding to the first hash value and a data location at which the received data is to be stored;
maintain the root node, the at least one leaf node and at least a first portion of the first hash page in a first volatile memory;
maintain a second portion of the first hash page in a second non-volatile memory, the second portion being retrieved from the second non-volatile memory when in use;
the first portion including a hash staging page of hash entries which have not been flushed to the second non-volatile memory and the second portion including hash entries of the first hash page previously flushed to the second non-volatile memory; and
the controller further configured to, when the first hash page does not include the entry for the first hash value:
add the first entry to the hash staging page;
determine that the hash staging page includes at least a threshold number of staged hash entries;
load, to the first volatile memory, the second portion from the second non-volatile memory;
merge the staged hash entries with the second portion to produce a merged hash page; and
flush the merged hash page to the second non-volatile memory.

2. The apparatus of claim 1, further comprising the first hash page including a bloom filter, the controller further configured to use the bloom filter to perform the determination of whether the first hash page does not include the entry for the first hash value.

3. The apparatus of claim 2, further comprising the controller further configured to:
when the first hash page does not include an entry for the first hash value, add the first hash value to the bloom filter.

4. The apparatus of claim 2, further comprising the controller further configured to, when the bloom filter does not determine the first hash page does not include the first hash value:
determine a second entry of the first hash page that has a second hash value that matches the first hash value;
determine whether the data of the second entry matches the received data; and
map a logical storage address for the received data to a data storage location of the data storage medium that contains data corresponding to the second entry when the controller determines the data of the second entry matches the received data.

5. The apparatus of claim 2, further comprising the controller further configured to: when the first hash page is not found, generate and add the first hash page to the hash database.

6. A method comprising:
receiving data and a request to store the data to a data storage medium;
computing a first hash value from the received data;
searching a hash database storing entries corresponding to hash values of previously stored data to find a first hash page of the hash database corresponding to a range of hash values including the first hash value, the hash database being a tree structure including a root node and at least one leaf node;
when the first hash page is found, determining whether the first hash page does not include an entry for the first hash value, the first hash page including a plurality of entries in the range of hash values corresponding to the first hash page, the first hash page further including a base hash value for the range of hash values; and when the first hash page does not include an entry for the first hash value, generating a first entry of the first hash page for the first hash value, the first entry including an offset value from the base hash value corresponding to the first hash value and a data location at which the received data is to be stored;

maintaining the root node, the at least one leaf node and at least a first portion of the first hash page in a first volatile memory;

maintaining a second portion of the first hash page in a second non-volatile memory;

wherein the first portion includes a hash staging page of hash entries which have not been flushed to the second non-volatile memory and the second portion including hash entries of the first hash page previously flushed to the second non-volatile memory;

when the first hash page does not include the entry for the first hash value:
   adding the first entry to the hash staging page;
   when the hash staging page includes at least a threshold number of staged hash entries:
      loading, to the first volatile memory, the second portion from the second non-volatile memory;
      merging the staged hash entries with the entries loaded from the first volatile memory to produce an updated hash page; and
      storing the updated hash page to the second non-volatile memory.

7. The method of claim 6, further comprising the first hash page including a bloom filter, the method further including using the bloom filter to perform the determination of whether the first hash page does not include the entry for the first hash value.

8. The method of claim 7, further comprising:
when the first hash page does not include an entry for the first hash value, adding the first hash value to the bloom filter.

9. The method of claim 7, further comprising, when the bloom filter does not determine the first hash page does not include the first hash value:
determining a second entry of the first hash page that has a second hash value that matches the first hash value;
determining whether the data of the second entry matches the received data; and
mapping a logical storage address for the received data to a data storage location of the data storage medium that contains data corresponding to the second entry in response to determining the data of the second entry matches the received data.

10. The method of claim 7, further comprising, when the first hash page is not found, generating and adding the first hash page to the hash database.

11. A device comprising:
an interface configured to receive data and a request to store the data to a data storage medium;
an input module configured to compute a first hash value from the received data; and
a controller configured to execute a hash database module to:
   search a hash database storing entries corresponding to hash values of previously stored data to find a first hash page of the hash database corresponding to a range of hash values including the first hash value, the hash database being a tree structure including a root node and at least one leaf node;
   when the first hash page is found, determine whether the first hash page does not include an entry for the first hash value, the first hash page including a plurality of entries in the range of hash values corresponding to the first hash page, the first hash page further including a base hash value for the range of hash values; and
   when the first hash page does not include an entry for the first hash value, generate a first entry of the first hash page for the first hash value, the first entry including an offset value from the base hash value corresponding to the first hash value and a data location at which the received data is to be stored;
   maintain the root node, the at least one leaf node and at least a first portion of the first hash page in a first memory;
   maintain a second portion of the first hash page in a second memory, the first memory and the second memory being different types of memory;
   the first portion including a hash staging page of hash entries which have not been flushed to the second memory and the second portion including hash entries of the first hash page previously flushed to the second memory;
   when the first hash page does not include the entry for the first hash value:
      add the first entry to the hash staging page;
      when the hash staging page includes at least a threshold number of staged hash entries:
         load, to the first memory, the second portion from the second memory;
         merge the staged hash entries with the second portion; and
         flush the merged entries to the second memory.

12. The device of claim 11 further comprising the first hash page including a bloom filter, the hash database module further configured to use the bloom filter to perform the determination of whether the first hash page does not include the entry for the first hash value.

13. The device of claim 12 further comprising the hash database module further configured to: when the first hash page does not include an entry for the first hash value, add the first hash value to the bloom filter.

14. The device of claim 12 further comprising the hash database module further configured to, when the bloom filter does not determine the first hash page does not include the first hash value:
determine a second entry of the first hash page that has a second hash value that matches the first hash value;
determine whether the data of the second entry matches the received data; and
map a logical storage address for the received data to a data storage location of the data storage medium that contains data corresponding to the second entry when the hash database module determines the data of the second entry matches the received data.

* * * * *